United States Patent
Yuan

(10) Patent No.: US 9,509,213 B1
(45) Date of Patent: Nov. 29, 2016

(54) CHARGE PUMP CIRCUIT SUITABLE FOR LOW VOLTAGE OPERATION

(71) Applicant: Qing Peng Yuan, Shanghai (CN)

(72) Inventor: Qing Peng Yuan, Shanghai (CN)

(73) Assignee: GIANTEC SEMICONDUCTOR, LTD. INC., Shanghai (CN)

( * ) Notice: Subject to any disclaimer, the term of this patent is extended or adjusted under 35 U.S.C. 154(b) by 0 days.

(21) Appl. No.: 14/919,730

(22) Filed: Oct. 22, 2015

(51) Int. Cl.
*G05F 1/10* (2006.01)
*H02M 3/07* (2006.01)

(52) U.S. Cl.
CPC ..................................... *H02M 3/07* (2013.01)

(58) Field of Classification Search
CPC ...... H02M 3/07; H03K 17/687; H03K 3/012
USPC ........... 327/536, 427, 434, 437, 537; 363/60
See application file for complete search history.

(56) References Cited

U.S. PATENT DOCUMENTS

| | | | |
|---|---|---|---|
| 6,881,997 B2 * | 4/2005 | Kaneko | H01L 27/0222 257/299 |
| 6,914,791 B1 | 7/2005 | Park et al. | |
| 8,519,779 B2 | 8/2013 | Ryu | |
| 2005/0151580 A1 * | 7/2005 | Lin | H02M 3/073 327/536 |
| 2005/0264343 A1 * | 12/2005 | Nakamura | H02M 3/073 327/536 |
| 2008/0079480 A1 * | 4/2008 | Utsunomiya | H02M 3/073 327/536 |
| 2009/0027108 A1 * | 1/2009 | Chen | H02M 3/073 327/536 |

* cited by examiner

*Primary Examiner* — Lincoln Donovan
*Assistant Examiner* — Thomas Skibinski
(74) *Attorney, Agent, or Firm* — Yuan Qing Jiang

(57) ABSTRACT

A charge pump device with NMOS transistor circuit is provided for low voltage operation. The charge pump stage, comprising four NMOS transistors and three capacitors, is configured to alleviate the substrate body effect and the charge transfer loss. The charge pump circuit can be constructed on a p-type semiconductor substrate directly without deep N well isolation. The circuit is driven by two non-overlapping complementary clock signals, which can be generated easily with an integrated fabrication. The charge pump device can be implemented with a multiple stage to provide a stable high voltage output.

10 Claims, 9 Drawing Sheets

PRIOR ART

PRIOR ART

CHARGE PUMP CIRCUIT SUITABLE FOR LOW VOLTAGE OPERATION

FIELD OF INVENTION

The present invention relates to a charge pump circuits, and finds particular application in connection with charge pump circuits capable of low voltage operation and will be described with particular reference thereto. It is to be understood, however, that it also finds application in other usage scenarios, and is not necessarily limited to the aforementioned exemplary embodiment.

BACKGROUND OF INVENTION

With rapidly growing popularity of handheld devices and emerging technology of internet of things, miniaturization and low power consumption are in high demand for integrated circuit (IC) in these devices. Low voltage design for these integrated circuits is necessary to achieve the goal of low power consumption. Yet a high voltage pulse is required to program or erase the data content stored in EEPROM (Electrically Erasable Programmable Read-Only Memory) and flash memory, and the high voltage pulse needs to be generated from a low voltage power supply to those devices. EEPROM and flash memory are able to maintain their data content even their power supply is turned off, and the data can be stored in the memories for a long time. These nonvolatile memory devices (both floating gate and charge trap based circuits) are broadly used in many electronics nowadays, in which a charge pump circuit is usually designed to perform the task of providing the high voltage pulses from a low voltage power supply.

FIG. 1 illustrates a classic Dickson charge pump circuit. In this circuit, NMOS transistors are constructed on P type silicon substrate and are connected as diodes. Each stage of the charge pump is formed by a diode or a diode-like device plus a capacitor. A number of the stages can be connected in serial and driven by two-phase clock signals to boost the output voltage to a level that is substantially higher than the supply voltage. Although the circuit is simple and can be readily implemented, it suffers from the body effect or substrate effect, which is defined as degradation of the threshold voltage due to a common connection of the substrate of NMOS transistors to the ground. The body effect is especially severe for latter stages of the pump with a higher boosted output voltage. Thus charge transfer efficiency is greatly reduced.

There are various methods in the art to alleviate the body effect. For example, NMOS transistors can be isolated in a deep n-type well as illustrated in FIG. 2. In this example, an NMOS transistor is formed inside a p-well 230 which is contained in a deep n-well 220 on p-type substrate 210. U.S. Pat. No. 6,914,791 is directed to an improved charge pump with each stage 200 isolated within its own deep n-well 220 that is electrically isolated from deep n-wells of other stages. However, this approach requires additional processes and complexity in device fabrication. It also raises concerns about parasitic bipolar effect related leakage or latch-up, and therefore it is not broadly used for implementation.

In another approach, charge transfer is controlled by transistor switches with precise on/off characteristics to direct charge flow. FIG. 3 illustrates a modification to Dickson charge pump, generally called CTS (Charge Transfer Scheme). In CTS charge pump, NMOS transistor M0 is a main switch. NMOS transistor M3 is an auxiliary switch which is in parallel with M0. NMOS transistor M1 together with PMOS transistor M2 forms a controlling element to M3. During the phase to turn on M3, the controlling element can pass next stage's higher output voltage to M3's gate terminal to boost its transfer efficiency. In CTS, however, the existence of PMOS transistor M2 complicates the layout and introduces the parasitic bipolar effect.

FIG. 4 illustrates another modification to Dickson charge pump, called "4-phase non-overlap clock boosting scheme". In this design, NMOS transistor circuit is used as shown in FIG. 4. NMOS transistor M2 is a transfer switch in stage 2. In order to generate the required high voltage, the charge stored in capacitor $C_d1$ is transferred to the capacitor $C_d2$ of stage 2 through the switch, M2. To prevent undesired voltage drop across switch M2, a boosting circuit must be used so as to reduce the switch on-resistance. The boosting function is realized by NMOS transistor M2', which is connected in between drain and source terminals of M2, and to capacitor $C_b2$.

FIG. 5 shows "4-phase non-overlap clock" that is used by some charge pump implementation such as illustrated in FIG. 4, or the like. When CLK3 is low, $C_d1$ is charging. At the same time, CLK2 is high to boost capacitor $C_b1$ and to fully turn on transistor M1 and ensure high conductance of M1 transistor. In this scheme, the so called "4-phase non-overlap clock" needs to be carefully designed and fine tuned to ensure its functionality, therefore its performance is sensitive to fluctuation of the supply voltage and process variation. Also, $C_b$'s recharge period squeezes M1's turn-on period, shortening M1's effective turn-on period. In addition, the circuit implementation is complex.

BRIEF DESCRIPTION OF THE DRAWINGS

A more complete appreciation of the invention and many of the attendant advantages thereof will be readily obtained and understood by referring to the following detailed description and the accompanying drawings in which like reference numerals denote like elements as between the various drawings. The drawings, briefly described below, are not to scale.

DETAILED DESCRIPTION OF THE INVENTION

Figure 1:
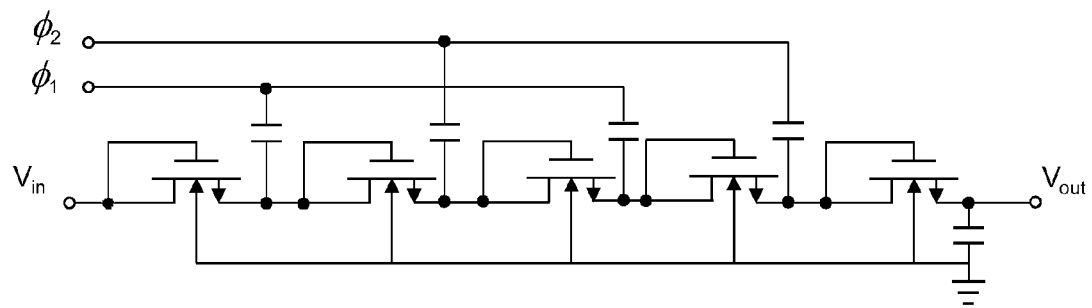
FIG. 1 is a prior art of Dickson charge pump circuit.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one ordinary skill in the art and having possession of this disclosure, are to be considered within the scope of the invention.

Figure 6:
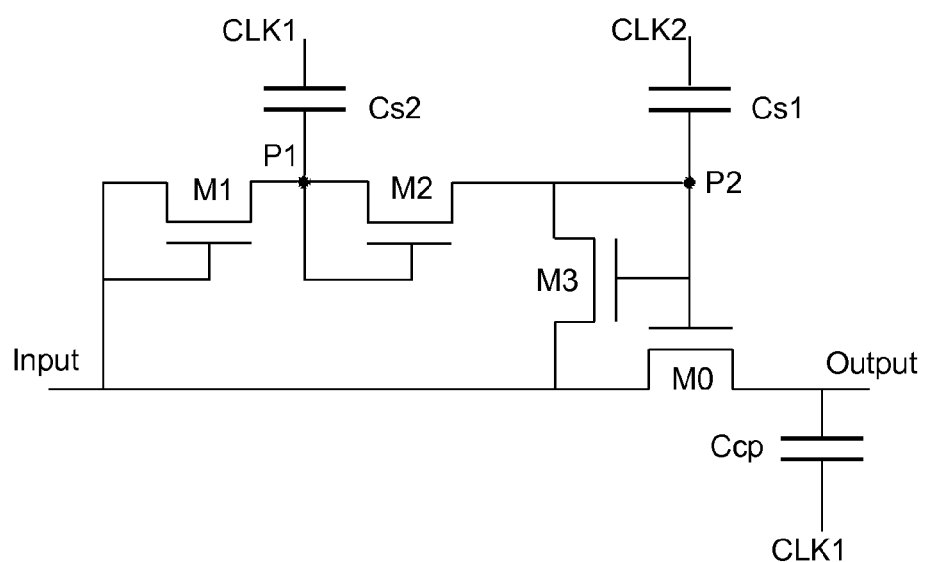
FIG. 6 is a charge pump circuit according to one of the embodiments of the present invention.

FIG. 6 illustrates one embodiment of the charge pump stage according to the present invention. The charge pump stage is formed by an NMOS circuit comprising four NMOS transistors. A first NMOS transistor, M0, has its drain communicatively connected to an input node. The source of transistor M0 is communicatively connected to an output node. A second NMOS transistor, M1, has its drain and gate communicatively connected to the input node. A third NMOS transistor, M2, has its drain and gate communicatively connected to the source of the second NMOS transistor, M1. A fourth NMOS transistor, M3, has its source communicatively connected to the input node and has its drain and gate communicatively connected to the source of the third NMOS transistor, M2, and to the gate of the first transistor, M0. The NMOS circuit in FIG. 6 also comprises three capacitors: a first capacitor, Cs2, communicatively connected to a first clock, CLK 1, and to the source of the second transistor, M1; a second capacitor, Cs1, communicatively connected to a second clock, CLK 2, and to the source of the third transistor, M2; and a third capacitor, Ccp, communicatively connected to the first clock, CLK1, and to the source of the first transistor, M0, and the output node.

In the NMOS circuit shown in FIG. 6, NMOS transistor M0 is a transfer switch that controls charge transfer of storage capacitor Ccp in each pump stage. NMOS transistors M1, M2, along with the two auxiliary boosting capacitors Cs2 and Cs1 that are driven by non-overlapping complementary clock signals CLK1 and CLK2, form a local 2-stage Dickson charge pump stage. The node, P2, is the output node of the local pump stage which is connected to the gate of charge transfer switch transistor M0. Thus due to the two-stage boosting, the local charge pump can provide a higher voltage to turn on M0 even the supply voltage is low, for example, below 1.2 V.

In one embodiment of the present invention, NMOS transistors in the circuit of FIG. 6 are constructed with a low threshold voltage in order to provide a high charge pumping efficiency. Taking the main transfer switch NMOS M0 as an example, it actually acts as a pass gate. The transfer loss and the lowest pass voltage level of the pass gate relate directly to M0's threshold voltage as well as the back-gate biased threshold voltage. In general, a low threshold voltage can be achieved by low doping density in NMOS channel. In one embodiment, the threshold voltage is less than 0.8 V, preferably less than 0.4 V. In another embodiment, the NMOS circuit of FIG. 6 comprises native NMOS transistors, whose threshold voltage is approximately zero.

In an actual circuit implementation, usually capacitance value of the two auxiliary capacitors Cs1 and Cs2 are substantially lower than that of storage capacitor Ccp. Referring to FIG. 6, charges to Cs1 and Cs2 are from Ccp of prior stage. The essential function of these capacitors is to boost the local voltage to control the pass gate M0. If the capacitance of Cs1 or Cs2 is too large, it could bypass too much charge that ought to have been to charge the capacitor Ccp of current stage, and could offset its boosting advantage to M0's passage capability. In one embodiment of the present invention, the capacitance value of Cs1 or Cs2 is in the range of 5% to 20% of that of Ccp. In typical implementation, auxiliary capacitor could be an order of the magnitude smaller than the storage capacitor. The actual capacitor values vary with circuit driving situations.

Figure 5:
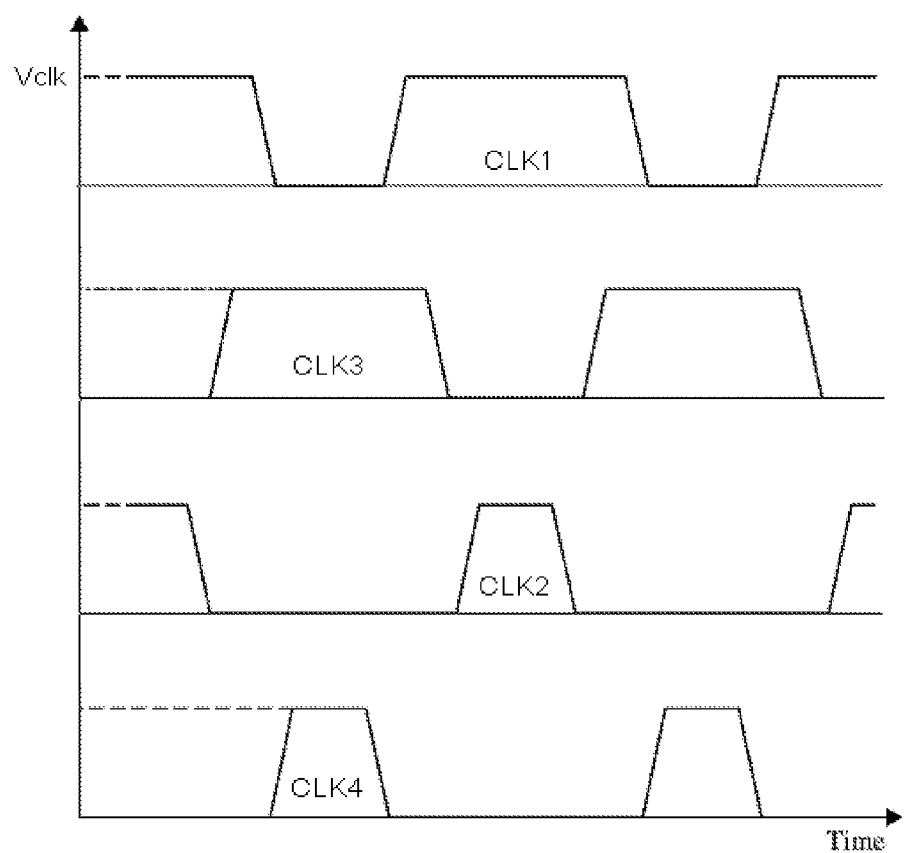
FIG. 5 is a prior art of clock wave diagram for driving a Dickson charge pump circuit.
Figure 7:
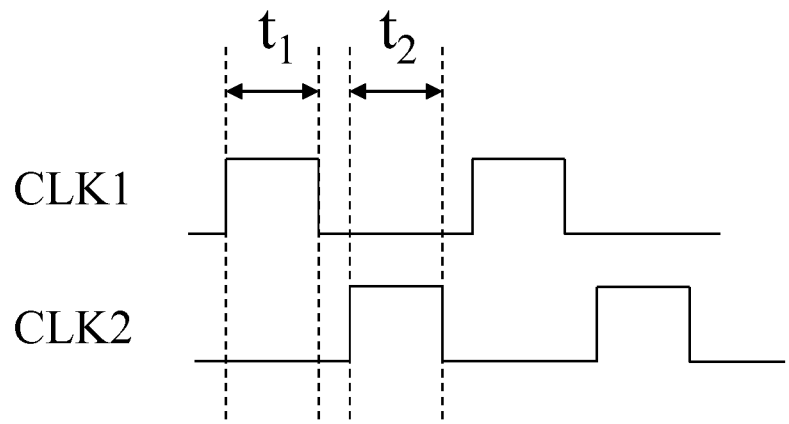
FIG. 7 is a clock wave diagram for driving a charge pump of the present invention.

FIG. 7 shows non-overlapping complementary clock signals of the first and second clock, CLK1 and CLK2. Compared with the approach of using 4-phase non-overlap clock of FIG. 5, implementing the two-phase complementary clock signal of FIG. 7 makes the clock generation circuit simpler.

Referring to both FIGS. 6 and 7, when CLK1 is high and CLK2 is low ($t_1$ period), transistor M0 is turned off. The charge stored in Ccp will be passed to next stage. At the same time, CLK1 will charge Cs1 through Cs2 and M2. NMOS transistor M3, with its drain and gate tied to M0's gate, and source connected to input node of pump stage, functions as a clamp diode to limit M3 gate to source overshoot voltage. During t1 clock cycle period, since the capacitor Cs1 is charging, the electric potential at node P2 rises. Transistor M3, which is connected as a diode, may be positively biased and turned on. Excessive charges accumulated in auxiliary capacitor Cs1 will be discharged through M3 to the input node of the current stage of the pump. Thereafter the charge will be passed through the transfer switch M0 to its source terminal, or output node of the stage. Thus, the charger in the auxiliary loop is recycled, which is beneficial to pump efficiency improvement. So, one of the functions of the transistor M3 is used to eliminate reverse leakage during M0's turn-off phase to avoid efficiency reduction.

When the clock signal reverses, CLK1 becomes low and CLK2 becomes high ($t_2$ period), Cs2 is charged through M1. CLK2's high potential is added to Cs1 and further coupled to M0's gate, whose voltage potential is substantially higher than M0's source and drain potential. Such a bias condition will favor M0's turn-on and charge transfer, and alleviate NMOS's substrate effect. During this time period, Ccp is charged by previous stage through M0.

Figure 2:
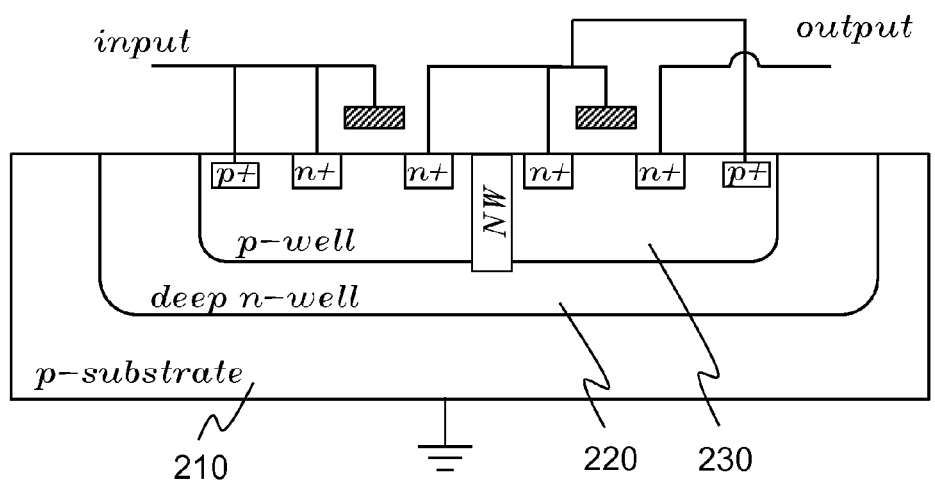
FIG. 2 is a prior art illustrating a cross section of the transistors in a Dickson charge pump built on a substrate.
Figure 3:
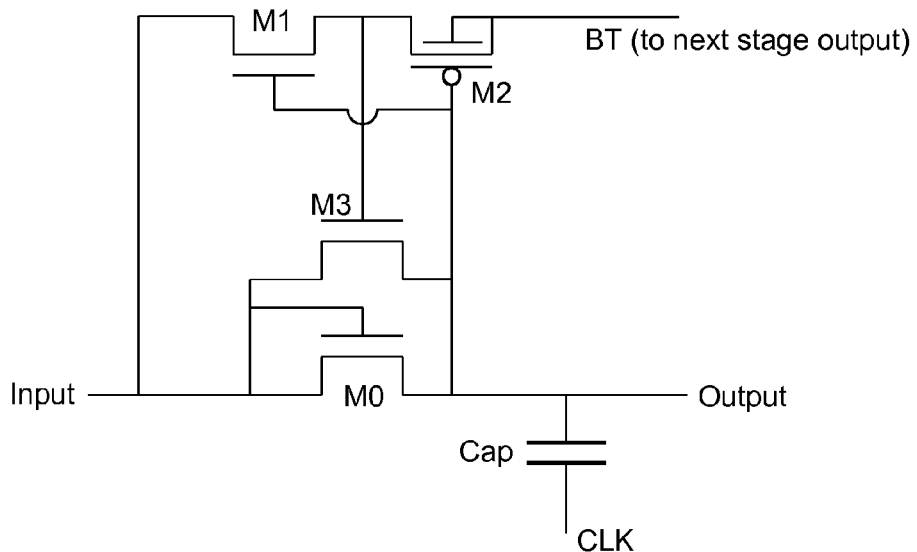
FIG. 3 is another prior art of Dickson charge pump circuit.
Figure 4:
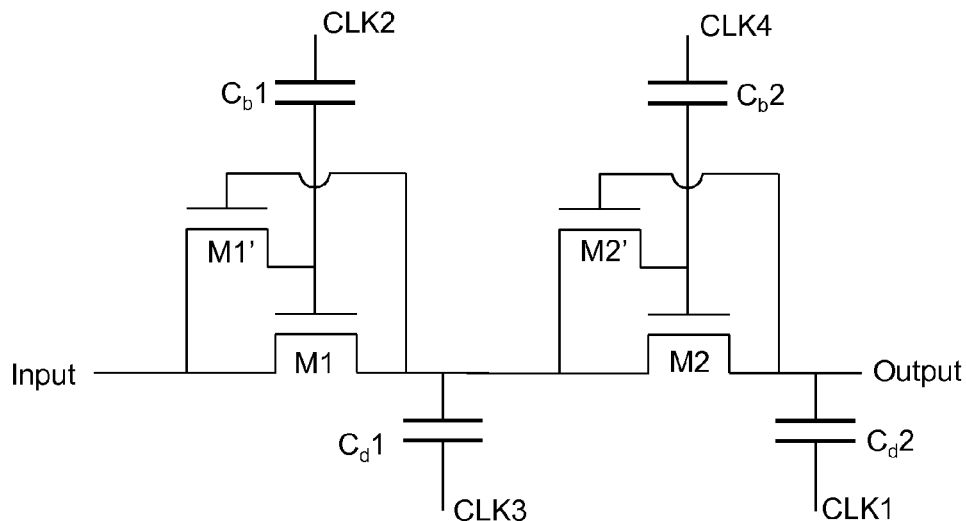
FIG. 4 is yet another prior art of Dickson charge pump circuit.
Figure 8:
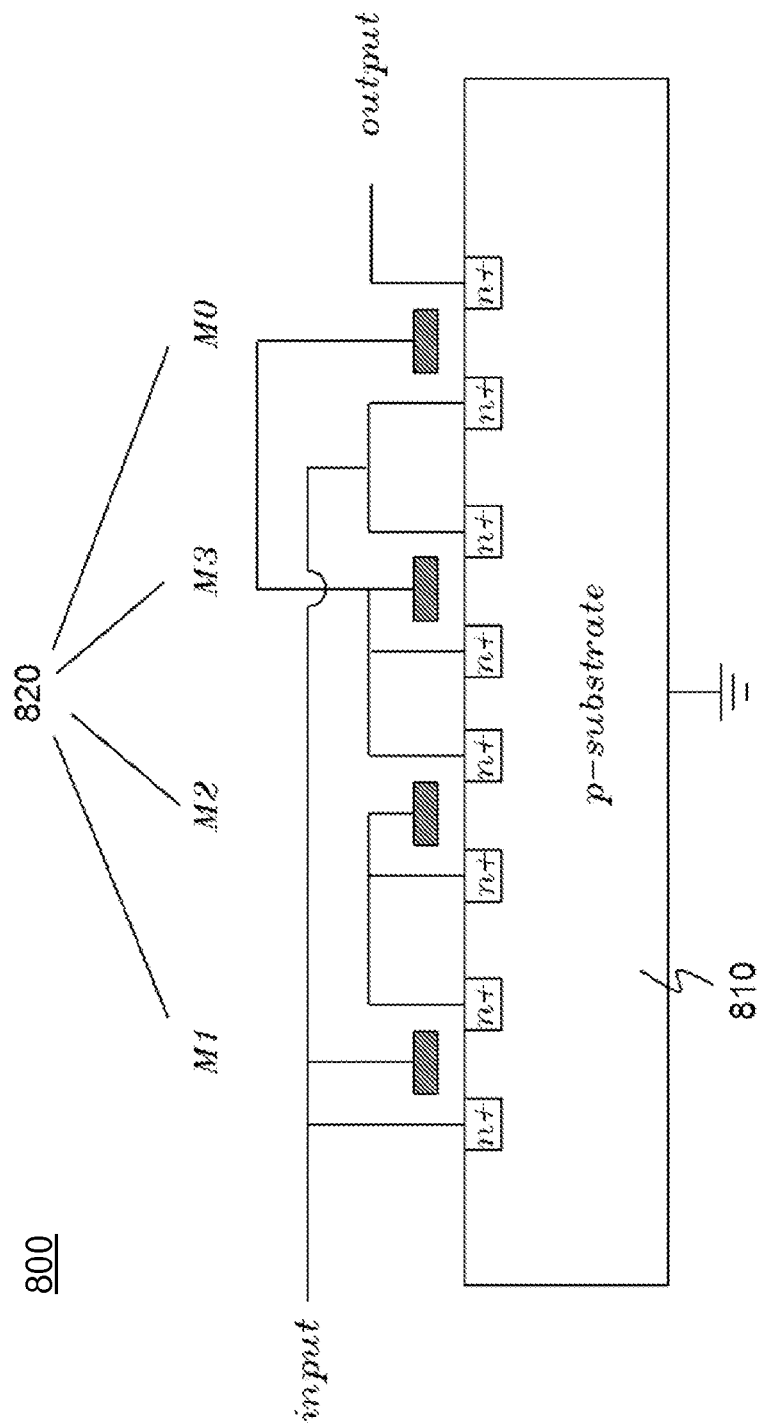
FIG. 8 illustrates the cross section of transistors of a charge pump built on a substrate according to one embodiment of the present invention.

FIG. 8 is a cross section diagram of one stage 800 of the charge pump related to the circuit shown in FIG. 6 in accordance to the present invention. Since the charge transfer controlling mechanism implemented in the circuit of FIG. 6 alleviates the body effect of the Dickson charge pump, all the NMOS transistors 820 can be constructed directly on p-type substrate 810. Typically, the substrate 810 is connected to the ground of the circuit. Without the need for electrical isolation in the substrate such as the deep n-well 220 as shown in FIG. 2, the structure 800 is more area-efficient and can be formed with less fabrication steps. It is also noted that an all-NMOS charge pump circuit requires less isolation during the fabrication process and causes less parasitic bipolar effect. These features lead to a smaller device area and low fabrication cost.

In the view of FIG. 8, the capacitors in the circuit of FIG. 6 are not shown. These capacitors can be fabricated by any well-known methods in the arts of CMOS process and therefore will not be described in details here.

Figure 9:
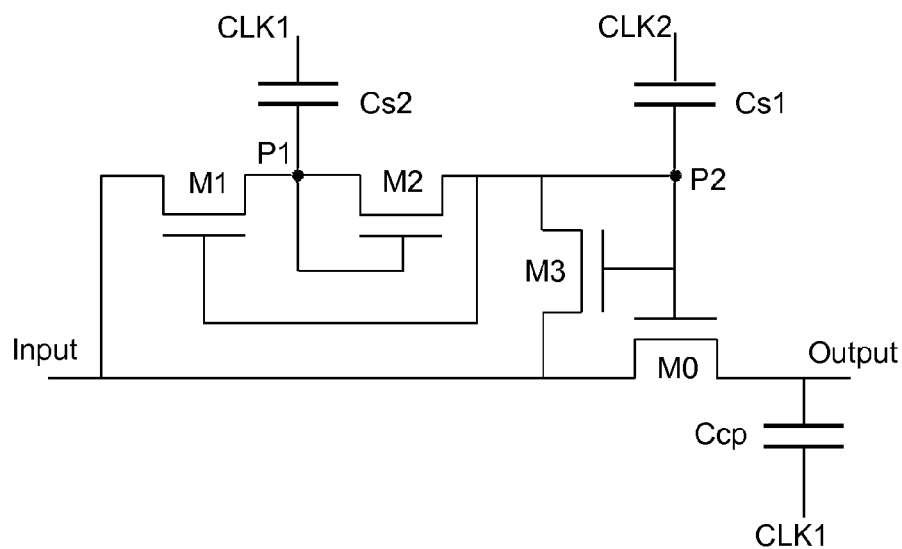
FIG. 9 is another charge pump circuit according to one embodiment of the present invention.

FIG. 9 illustrates an alternative embodiment of the charge pump stage in according to the present invention. In this circuit, the gate of transistor M1 is communicatively connected to the node P2. The rest of the circuit of FIG. 9 is the same as that shown in FIG. 6. In the circuit of FIG. 9, although the gate connection of transistor M1 is different from that of FIG. 6, the function of the two-stage boost circuit is the same. When CLK1 is high and CLK2 is low, transistor M0 is turned off, as described earlier related to the working mechanism for the circuit of FIG. 6. During this time period, transistor M1 is off since the gate of M1 is connected to node P2, resulting in charge transfer from capacitor Cs2 to Cs1. While CLK1 is low and CLK2 is high, transistor M0 is turned on. The voltage at node P2 is high that turns on transistor M1. During this clock period, capacitor Cs2 is charging through M1. Therefore, the process of charging and discharging of capacitor Cs2 and Cs1 corresponding to the clock cycles is the same as that of the circuit of FIG. 6, as indicated in FIG. 7.

Figure 10:
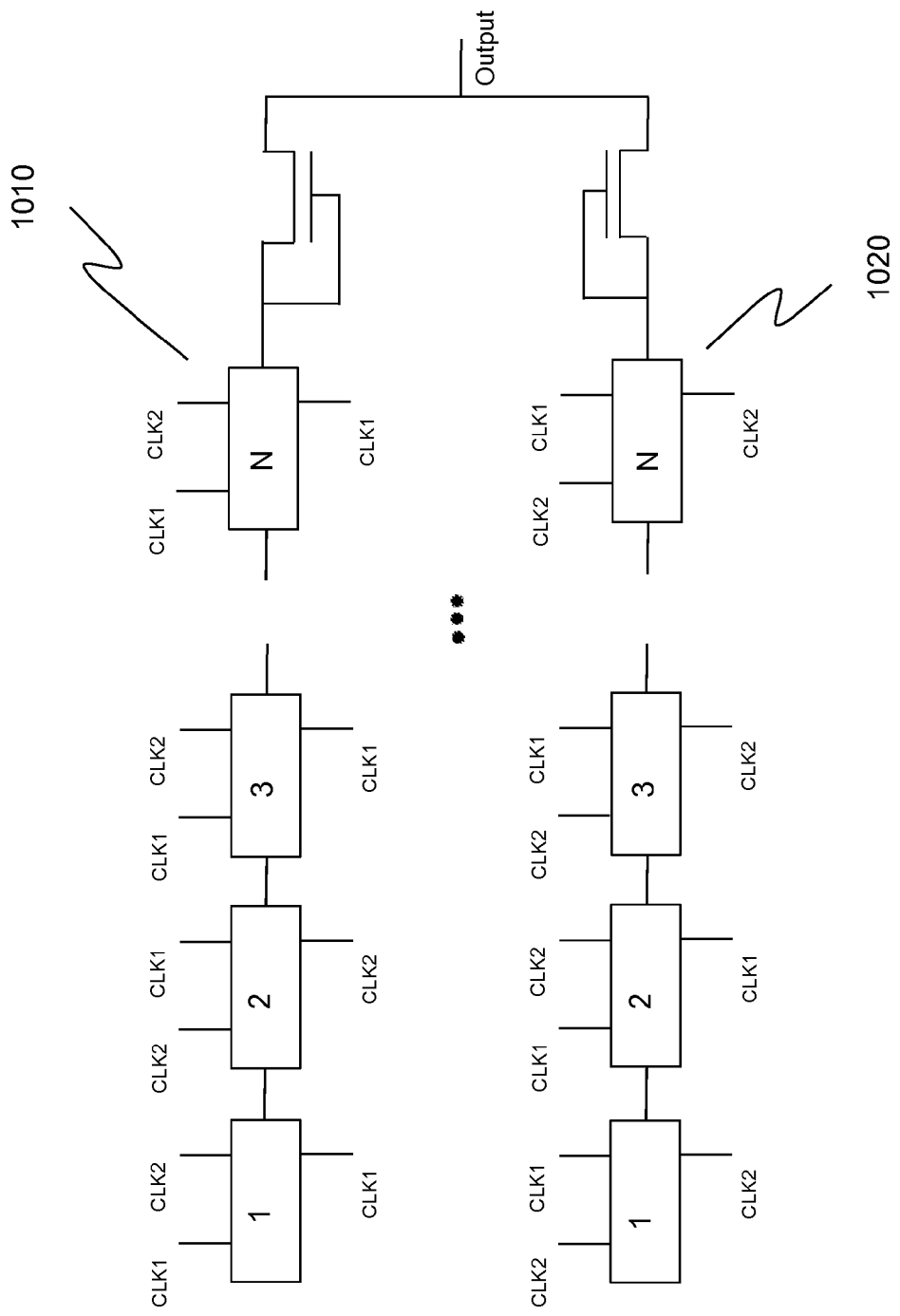
FIG. 10 is a logic circuit diagram illustrating an example of a charge pump circuit according to one embodiment of the present invention.

The charge pump stage shown in FIG. 6 or FIG. 9 can be connected in series to provide elevated voltage output. Referring to FIG. 10, the output node of each stage is connected to the input node of the next stage, while the two non-overlapping complementary clock signals to each stage are inverted relative to the next stage. The input node of the first stage is usually tied to the supply voltage. In another embodiment, two branches of charge pump stages connected in series, 1010 and 1020, can be connected in parallel, as shown in FIG. 10. The clock signals in each corresponding stage in 1010 and 1020 are inverted. Such arrangement can reduce output ripple while maintaining clock frequency and driving capability.

Figure 11:
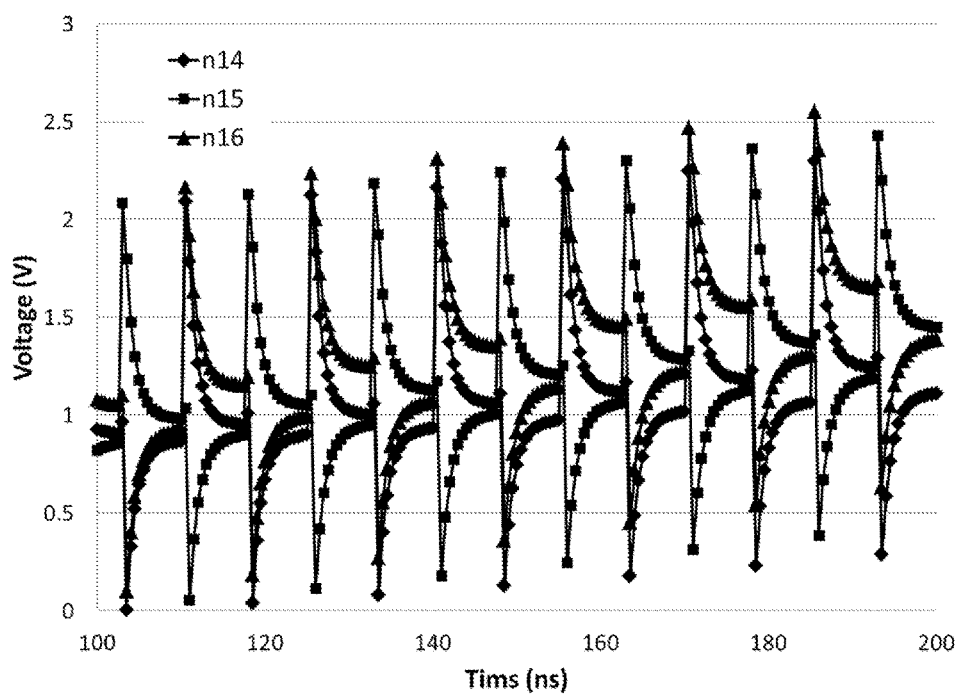
FIG. 11 displays circuit simulation results of a multi-stage charge pump of the present invention.

FIG. 11 displays circuit simulation results for the charge pump with multiple stages in according to one embodiment of the present invention. In this simulation, the input and supply voltage is 1.0 V and the capacitance for Cs1, Cs2, and Ccp is 0.1 pF, 0.1 pF and 1 pF respectively. The clock cycle time is 15 ns. The simulation shows the amplified pulses after $14^{th}$, $15^{th}$ and $16^{th}$ stage. As the charge pump started, the amplitude of the pulses improves with the clock cycle. After about 180 nsec, the output pulses at $14^{th}$ and $16^{th}$ stage reaches 2.3 V and 2.5 V, respectively. With more stages, the charge pump can escalate charges stage by stage until reaching the desired pulse amplitude.

As described above, the charge pump circuits according to the present invention provide charge pump devices with a high charge pumping efficiency and a high voltage for memory device operation at a low supply voltage. Due to elimination of deep NWell isolation and PMOS circuit, the charge pump circuit can be constructed by all ordinary NMOS transistors, which reduce fabrication steps and improve device area efficiency. In addition, the charge pump circuit of the present invention is operated by a two-phase complementary clock signal that simplifies the requirement of clock generation circuit. Furthermore, the efficiency of the charge pump is greatly improved by gate voltage boosting to the transfer switch, making it suitable for low voltage operation, or under satisfaction of certain loading condition. Such implementation through present invention can help reduce silicon estate occupation, or power consumption.

While examples and variations have been presented in the foregoing description, it should be understood that a vast number of variations exist, and these examples are merely representative, and are not intended to limit the scope, applicability or configuration of the disclosure in any way. Various of the above-disclosed and other features and functions, or alternative thereof, may be desirably combined into many other different systems or applications. Various presently unforeseen or unanticipated alternatives, modifications variations, or improvements therein or thereon may be subsequently made by those skilled in the art which are also intended to be encompassed by the claims, below.

Therefore, the foregoing description provides those of ordinary skill in the art with a convenient guide for implementation of the disclosure, and contemplates that various changes in the functions and arrangements of the described examples may be made without departing from the spirit and scope of the disclosure defined by the claims thereto.

What is claimed is:

1. A charge pump circuit, comprising at least one charge pump stage driven by a first and second clock; wherein said charge pump stage comprises:
   an input node;
   a first NMOS transistor having its drain communicatively connected to said input node;
   a second NMOS transistor having its drain communicatively connected to said input node;
   a third NMOS transistor having its drain and gate communicatively connected to the source of said second NMOS transistor;
   a fourth NMOS transistor having its source communicatively connected to the input node and having its drain and gate communicatively connected to the source of said third NMOS transistor and to the gate of said first transistor;
   a first capacitor communicatively connected to said first clock and to the source of said second transistor;
   a second capacitor communicatively connected to said second clock and to the source of said third transistor;
   a third capacitor communicatively connected to said first clock and to the source of said first transistor;
   an output node communicatively connected to the source of said first transistor.

2. The charge pump circuit of claim 1, wherein the gate of said second NMOS transistor is communicatively connected to the input node.

3. The charge pump circuit of claim 1, wherein the gate of said second NMOS transistor is communicatively connected to the source of said third NMOS transistor.

4. The charge pump circuit of claim 1, wherein all of the NMOS transistors are built directly on a p-type substrate that are communicatively connected to ground.

5. The charge pump circuit of claim 1, wherein all of the NMOS transistors have threshold voltage <0.8 V.

6. The charge pump circuit of claim 1, wherein all of the NMOS transistors are native NMOS transistors.

7. The charge pump circuit of claim 1, wherein the phase of the first and second clock signals are complementary.

8. The charge pump circuit of claim 1, wherein the capacitance of the first or the second capacitor is substantially smaller than the capacitance of the third capacitor.

9. The charge pump circuit of claim 1 further comprises a chain of a plurality of the charge pump stages which are connected in serial from the output node of one stage to the input node of the next stage.

10. The charge pump circuit of claim 9 comprises two parallel chains of the charge pump stages; wherein the phase of the first and the second clock signal for each corresponding stage in the parallel chains are inversed.

* * * * *